(12) United States Patent
Kashyap et al.

(10) Patent No.: US 9,160,766 B2
(45) Date of Patent: Oct. 13, 2015

(54) SYSTEMS AND METHODS FOR PROTECTING ORGANIZATIONS AGAINST SPEAR PHISHING ATTACKS

(71) Applicant: Symantec Corporation, Mountain View, CA (US)

(72) Inventors: Anand Kashyap, Maharashtra (IN); Sudhanshu Shekhar, New Delhi (IN)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/262,422

(22) Filed: Apr. 25, 2014

(65) Prior Publication Data
US 2015/0264084 A1    Sep. 17, 2015

(30) Foreign Application Priority Data

Mar. 12, 2014  (IN) .............................. 290/KOL/2014

(51) Int. Cl.
| | | |
|---|---|---|
| *G06F 11/00* | (2006.01) | |
| *G06F 12/14* | (2006.01) | |
| *H04L 29/06* | (2006.01) | |
| *G06Q 10/10* | (2012.01) | |
| *G06F 12/16* | (2006.01) | |
| *G06F 7/04* | (2006.01) | |

(52) U.S. Cl.
CPC ............ *H04L 63/1483* (2013.01); *G06Q 10/10* (2013.01)

(58) Field of Classification Search
CPC .............. H04L 63/102; H04L 63/1483; H04L 63/1408; H04L 67/02; H04L 67/306; H04L 12/585; H04L 51/12
See application file for complete search history.

(56) References Cited

U.S. PATENT DOCUMENTS

| | | | |
|---|---|---|---|
| 8,738,906 B1* | 5/2014 | Sampath et al. ............... | 713/166 |
| 2009/0077383 A1* | 3/2009 | de Monseignat et al. ..... | 713/175 |
| 2012/0124671 A1* | 5/2012 | Fritzson et al. ................. | 726/26 |
| 2012/0258437 A1* | 10/2012 | Sadeh-Koniecpol et al. . | 434/362 |
| 2012/0311703 A1* | 12/2012 | Yanovsky et al. ............... | 726/22 |
| 2013/0198846 A1* | 8/2013 | Chapman ........................ | 726/25 |

OTHER PUBLICATIONS

Lee, Martin, "Who's Next? Identifying Risk Factors for Subjects of Targeted Attacks", 22nd Virus Bulletin Conference VB2012, (Sep. 2012).
Lee, Martin, "Identifying Risk Factors for Targeted Attack", http://www.symantec.com/connect/blogs/identifying-risk-factors-targeted-attack, as accessed Dec. 10, 2013, (Sep. 27, 2012).

* cited by examiner

*Primary Examiner* — Dede Zecher
*Assistant Examiner* — Trang Doan
(74) *Attorney, Agent, or Firm* — ALG Intellectual Property, LLC (57) ABSTRACT

A computer-implemented method for protecting organizations against spear phishing attacks may include (1) searching a plurality of websites for user profiles belonging users who are affiliated with an organization and who have access to at least one privileged computing resource controlled by the organization, (2) retrieving, from the user profiles, personal information describing the users, (3) determining, based on the personal information, that a portion of the user profiles belongs to an individual user with access to the privileged computing resource, (4) identifying at least one phishing attack risk factor in the user profiles that belong to the individual user, and (5) assessing, based at least in part on the phishing attack risk factor, a risk of a phishing attack targeting the individual user to illegitimately gain access to the privileged computing resource. Various other methods, systems, and computer-readable media are also disclosed.

20 Claims, 7 Drawing Sheets

SYSTEMS AND METHODS FOR PROTECTING ORGANIZATIONS AGAINST SPEAR PHISHING ATTACKS

BACKGROUND

Advanced persistent threats (APTs) are a growing problem in the world of information security. APTs are groups that are capably of effectively targeting a specific entity. APTs may range from nation-states to organized crime and may threaten the security of an organization in a variety of ways. Sensitive data is commonly targeted by APTs, causing monetary and reputation damages to affected organizations. APTs may steal intellectual property, financial details of customers and employees, organizational strategy information, or any other type of confidential data. Many attacks by APTs begin with a spear phishing attack against a member of the organization. Spear phishing attacks may use personal information about a targeted member of an organization to individualize the phishing attack, giving the attack a greater chance of success.

Traditional systems for preventing phishing attacks are seldom capable of securing organizations against individualized phishing attacks such as spear phishing. Many traditional systems may focus on preventing generic phishing attacks against the entire organization, and may lack the fine-grained controls necessary to prevent more specific phishing attacks. Traditional systems may not be capable of identifying which members of the organization may be likely targets for phishing attacks. Accordingly, the instant disclosure identifies and addresses a need for additional and improved systems and methods for protecting organizations against spear phishing attacks.

SUMMARY

As will be described in greater detail below, the instant disclosure generally relates to systems and methods for protecting organizations against spear phishing attacks by retrieving profiles of users connected to the organization from websites, correlating multiple profiles that belong to the same user, and analyzing the correlated profiles for phishing attack risk factors to determine the risk of a spear phishing attack targeting the user.

In one example, a computer-implemented method for protecting organizations against spear phishing attacks may include (1) searching a plurality of websites for a plurality of user profiles belonging to a plurality of users who are affiliated with an organization and who have access to at least one privileged computing resource controlled by the organization, (2) retrieving, from the plurality of user profiles, personal information describing the plurality of users, (3) determining, based on the personal information, that a portion of the plurality of user profiles belongs to an individual user with access to the privileged computing resource controlled by the organization, (4) identifying at least one phishing attack risk factor in the portion of the plurality of user profiles that belongs to the individual user, and (5) assessing, based at least in part on the phishing attack risk factor, a risk of a phishing attack targeting the individual user to illegitimately gain access to the privileged computing resource.

Once the phishing attack risk factor has been determined, the organization may employ a variety of automatic and/or manual countermeasures. In some embodiments, the computer-implemented method may further include performing a security action based on the risk of the phishing attack targeting the individual user. In some examples, the computer-implemented method may further include defining the security action by selecting the security action from a set of potential security actions for addressing phishing attacks based on the phishing attack risk factor and/or configuring the security action with a parameter based on the phishing attack risk factor. For example, the security action may include (1) adding an email filter for the individual user with at least one keyword derived from the phishing attack risk factor, (2) adjusting a privilege of the individual user to access the privileged computing resource, and/or (3) warning the individual user about the phishing attack risk factor.

In many scenarios, phishing attack risk factors may be present on websites external to the organization. In one example, the plurality of websites may include at least one third-party website not controlled by the organization. For example, at least one of the websites may include a social networking platform.

Users of a variety of types may have access to sensitive organizational resources. The plurality of users who are affiliated with the organization may include (1) employees of the organization, (2) former employees of the organization, and/or (3) contractors hired by the organization.

In one embodiment, determining, based on the personal information, that the portion of the user profiles belong to the individual user may include determining that a first profile within the user profiles belongs to the individual user and then determining that a second profile within the user profiles also belongs to the individual user by (1) identifying a hyperlink from the first profile to the second profile, (2) identifying a unique identifier for the individual user that appears within both the first profile and the second profile, and/or (3) identifying a plurality of non-unique identifiers that each appear within the first profile and the second profile.

In some examples, assessing the risk of the phishing attack targeting the individual users may include (1) identifying a set of training data that includes user profiles of users within organizations previously targeted by phishing attacks (where the set of training data indicates which users were targeted by the phishing attacks), (2) using the set of training data to build a machine learning classifier that classifies users, based on user profile data, according to a likelihood that each user will be targeted in phishing attacks, and (3) assessing the risk of the phishing attack targeting the individual user with the machine learning classifier by providing the phishing attack risk factor as input to the machine learning classifier.

In one embodiment, a system for implementing the above-described method may include (1) a search module, stored in memory, that searches a plurality of websites for a plurality of user profiles belonging to a plurality of users who are affiliated with an organization and who have access to at least one privileged computing resource controlled by the organization, (2) a retrieval module, stored in memory, that retrieves, from the plurality of user profiles, personal information describing the plurality of users, (3) a determination module, stored in memory, that determines, based on the personal information, that a portion of the plurality of user profiles belongs to an individual user with access to the privileged computing resource controlled by the organization, (4) an identification module, stored in memory, that identifies at least one phishing attack risk factor in the portion of the plurality of user profiles that belongs to the individual user, (5) an assessment module, stored in memory, that assesses, based at least in part on the phishing attack risk factor, a risk of a phishing attack targeting the individual user to illegitimately gain access to the privileged computing resource, and (6) at least one processor configured to execute the search module, the retrieval module, the determination module, the identification module, and the assessment module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) search a plurality of websites for a plurality of user profiles belonging to a plurality of users who are affiliated with an organization and who have access to at least one privileged computing resource controlled by the organization, (2) retrieve, from the plurality of user profiles, personal information describing the plurality of users, (3) determine, based on the personal information, that a portion of the plurality of user profiles belongs to an individual user with access to the privileged computing resource controlled by the organization, (4) identify at least one phishing attack risk factor in the portion of the plurality of user profiles that belongs to the individual user, and (5) assess, based at least in part on the phishing attack risk factor, a risk of a phishing attack targeting the individual user to illegitimately gain access to the privileged computing resource.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for protecting organizations against spear phishing attacks. As will be explained in greater detail below, by searching publicly available Internet profiles of organization employees, systems described herein can assess which employees are most vulnerable to spear phishing attacks in a similar manner to attackers. By determining which employees are the most likely targets, organizations can focus their phishing prevention efforts on those employees and their individual phishing risk factors, increasing the chances that the phishing prevention efforts will be successful.

Figure 1:
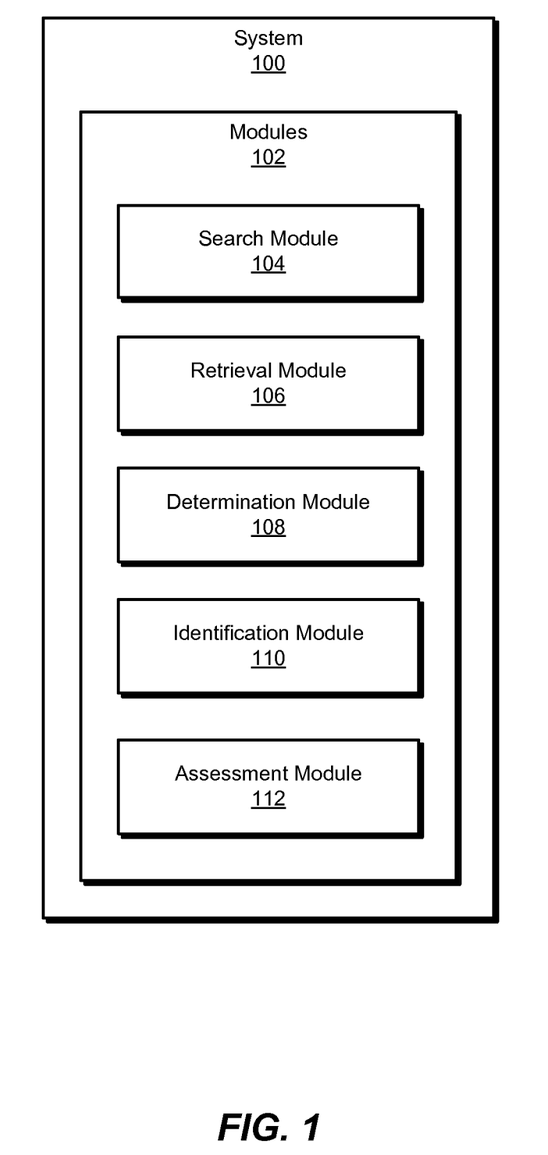
FIG. 1 is a block diagram of an exemplary system for protecting organizations against spear phishing attacks.
Figure 2:
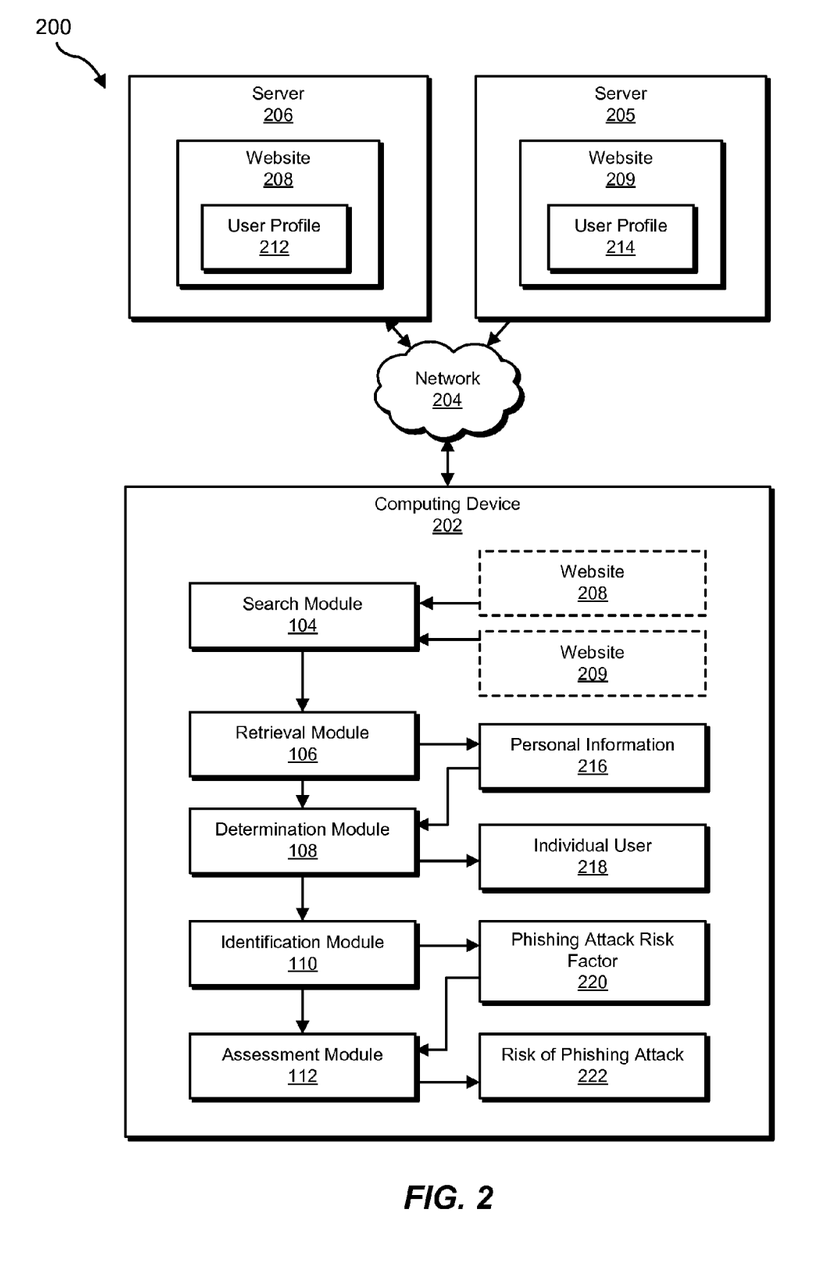
FIG. 2 is a block diagram of an additional exemplary system for protecting organizations against spear phishing attacks.

The following will provide, with reference to FIGS. 1 and 2, detailed descriptions of exemplary systems for protecting organizations against spear phishing attacks. Detailed descriptions of corresponding computer-implemented methods will also be provided in connection with FIG. 3. Detailed descriptions of an exemplary set of data that may be retrieved by systems described herein will be provided in connection with FIG. 4. Detailed descriptions of an exemplary decision tree for determining which users within an organization may be targeted by phishing attacks will be provided in connection with FIG. 5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for protecting organizations against phishing attacks. As illustrated in this figure, exemplary system 100 may include one or more modules 102 for performing one or more tasks. For example, and as will be explained in greater detail below, exemplary system 100 may include a search module 104 that may search websites user profiles belonging to users who are affiliated with an organization and who have access to at least one privileged computing resource controlled by the organization. Exemplary system 100 may additionally include a retrieval module 106 that may retrieve, from the user profiles, personal information describing the users. Exemplary system 100 may also include a determination module 108 that may determine, based on the personal information, that a portion of the user profiles belong to an individual user with access to the privileged computing resource controlled by the organization. Exemplary system 100 may additionally include an identification module 110 that may identify at least one phishing attack risk factor in the user profiles that belong to the individual user. Exemplary system 100 may also include an assessment module 112 that may assess, based at least in part on the phishing attack risk factor, a risk of a phishing attack targeting the individual user to illegitimately gain access to the privileged computing resource. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or servers 205 and/or 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with servers 205 and/or 206 via a network 204. In one example, computing device 202 may be programmed with one or more of modules 102. Additionally or alternatively, servers 205 and/or 206 may be programmed with one or more of modules 102.

In one embodiment, one or more of modules 102 from FIG. 1 may, when executed by at least one processor of computing device 202, server 205 and/or server 206, enable computing device 202, server 205 and/or server 206 to protect organizations against spear phishing attacks. For example, and as will be described in greater detail below, one or more of modules 102 may cause computing device 202, server 205 and/or server 206 to protect organizations against spear phishing attacks. For example, and as will be described in greater detail below, search module 104 may search websites 208 and/or 209 for user profiles 212 and/or 214 belonging to users who are affiliated with an organization and who have access to at least one privileged computing resource controlled by the organization. Next, retrieval module 106 may retrieve, from user profiles 212 and/or 214, personal information 216 describing the users. After personal information 216 has been retrieved, determination module 108 may determine, based on personal information 216, that user profiles 212 and/or 214 belong to an individual user 218 with access to the privileged computing resource controlled by the organization. Once the profiles have been correlated, identification module 110 may identify at least one phishing attack risk factor 220 in user profiles 212 and/or 214 that belong to individual user 218. Finally, assessment module 112 may assess, based at least in part on phishing attack risk factor 220, a risk of a phishing attack 222 targeting individual user 218 to illegitimately gain access to the privileged computing resource.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Servers 205 and 206 generally represent any type or form of computing device that is capable of hosting websites. Examples of servers 205 and 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202, server 205 and/or server 206.

Figure 3:
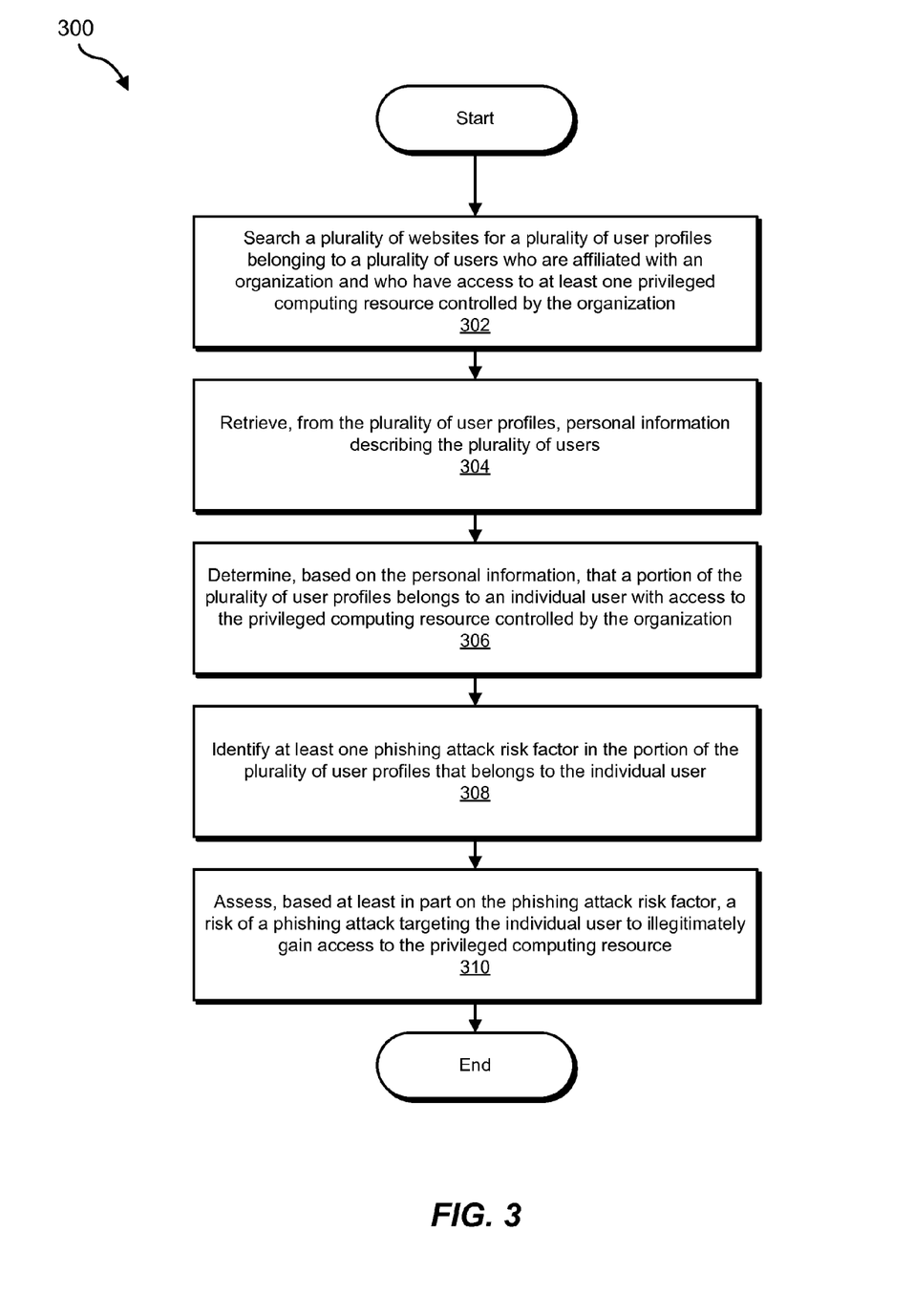
FIG. 3 is a flow diagram of an exemplary method for protecting organizations against spear phishing attacks.

FIG. 3 is a flow diagram of an exemplary computer-implemented method 300 for protecting organizations against spear phishing attacks. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may search a plurality of websites for a plurality of user profiles belonging to a plurality of users who are affiliated with an organization and who have access to at least one privileged computing resource controlled by the organization. For example, at step 302 search module 104 may, as part of computing device 202 in FIG. 2, search websites 208 and/or 209 for user profiles 212 and/or 214 belonging to users who are affiliated with an organization and who have access to at least one privileged computing resource controlled by the organization.

The term "website," as used herein, generally refers to any resource or set of resources hosted on one or more servers and available via the Internet. For example, a website may include an Internet resource that may host and/or provide access to one or more user profiles. In some examples, the plurality of websites may include at least one third-party website not controlled by the organization. For example, the websites may include social media platforms such as LINKEDIN, TWITTER, FACEBOOK, and/or GOOGLE+. Additionally or alternatively, the websites may include people search websites such as PEEKYOU and/or SPOKEO.

The phrase "user profiles," as used herein, generally refers to any data that includes personal information about a user. The contents of a user profile may be partially or entirely controlled by the user, other users of the website, and/or one or more website administrators. Examples of user profiles may include, without limitation, an entry in a staff directory, a social media profile, and/or a gaming account profile. In some examples, user profiles may include information useful for crafting an individualized phishing attack targeting the user in order to gain access to a sensitive resource controlled by the user's organization.

The term "organization," as used herein, generally refers to any group including both individuals and resources. An organization may include members and/or employees as well as computing, financial, physical, and/or other resources. In some examples, an organization may include a corporation, a sports team, a social club, a religious club, and/or an academic institution. In some examples an organization may be a portion of a larger organization, such as a department within a corporation.

Users who are affiliated with an organization may include employees of the organization, former employees of the organization, and/or contractors hired by the organization. In some examples, an organization may control sensitive computing resources to which only some members of the organization may be granted access. In these examples, the members of the organization with access to the sensitive resources may be the targets of phishing attacks attempting to gain access to the sensitive resources.

Search module 104 may search the websites for profiles belonging to users affiliated with the organization in a variety of ways. Search module 104 may use a manually determined list of websites and/or may generate a list of websites that may include user profiles by crawling the Internet. Search module 104 may use external search engines such as GOOGLE to search the websites and/or may use the internal search features of the websites, including search features made available via application programming interfaces. In some examples, search module 104 may discover user profiles via links from other user profiles, such as a link from a FACEBOOK page to a TWITTER account.

In one example, search module 104 may search several social media platforms for keywords associated with the organization. The keywords may be part of user profiles and/or may be a part of a page for the organization that may be connected to user profiles. In one example, search module 104 may search FACEBOOK for "SYMANTEC" and then search the resulting profiles for phrases such as "Symantec Engineer" and/or "working at Symantec." In another example, search module 104 may search LINKEDIN for users listing SYMANTEC as their current employer. Additionally or alternatively, search module 104 may search TWITTER for users who follow the official SYMANTEC account.

In some examples, the websites may have daily limits, throttling, limited search results, and/or some other form of access control. In these examples, search module 104 may use multiple accounts on the websites, may make requests from multiple Internet protocol addresses, may use a combination of application programming interface and browser requests, may cache previous results, and/or may continuously make requests just below the throttling limit. For example, search module 104 may use multiple LINKEDIN accounts to avoid a 100 employee limit that LINKEDIN may impose on searches. In some embodiments, search module 104 may include multiple instances running in parallel to improve performance.

The phrase "privileged computing resources," as used herein, generally refers to any computing resources to which access may be restricted based on the privilege level of the user. Privileged computing resources may include sensitive data, may have high-level permissions, and/or may run privileged software. For example, a privileged resource may include a computing device storing the organization's internal financial data that may only be accessed by members of the accounting department. In another example, a privileged computing resource may include a profile on an internal network that has administrative permissions over all other profiles and may only be accessed by the Information Technology manager.

At step 304 one or more of the systems described herein may retrieve, from the plurality of user profiles, personal information describing the plurality of users. For example, at step 304 retrieval module 106 may, as part of computing device 202 in FIG. 2, retrieve, from user profiles 212 and/or 214, personal information 216 describing the plurality of users.

The phrase "personal information," as used herein, generally refers to any information that may be used to identify and/or characterize an individual user. Personal information may include contact information such as a home address, phone number, and/or email address and/or descriptive information such as name, age, location, images, hobbies, job history and/or current job title. Personal information may also include links to external resources such as web pages for organizations the user is affiliated with, articles about the user, and/or additional profiles of the user.

Retrieval module 106 may retrieve the personal information in a variety of ways and contexts. For example, retrieval module 106 may download the contents of the user profiles from the social media platforms searched in step 302. In one example, retrieval module 106 may download the profile image and the contents of the "About" tab from the user's FACEBOOK profile.

At step 306 one or more of the systems described herein may determine, based on the personal information, that a portion of the plurality of user profiles belongs to an individual user with access to the privileged computing resource controlled by the organization. For example, at step 306 determination module 108 may, as part of computing device 202 in FIG. 2, determine, based on personal information 216, that a portion of user profiles 212 and/or 214 belongs to an individual user 218 with access to the privileged computing resource controlled by the organization.

Determination module 108 may determine that the profiles belong to the individual user in a variety of ways. For example, determination module 108 may analyze the profiles and determine that a portion of the profiles include personal information that uniquely identifies the individual user.

Determination module 108 may store the user profiles in a variety of ways. In some embodiments, determination module 108 may store the user profiles in text files and/or databases. For example, determination module 108 may store the user profiles as JSON objects in a MONGODB database.

In one embodiment, determination module 108 may determine, based on the personal information, that the portion of the plurality of user profiles belongs to the individual user by determining that a first profile within the portion of the plurality of the user profiles belongs to the individual user and determining that a second profile within the portion of the plurality of user profiles also belongs to the individual user. Determination module 108 may make this determination in a number of ways, including (1) identifying a hyperlink from the first profile to the second profile, (2) identifying a unique identifier for the individual user that appears within both the first profile and the second profile, and/or (3) identifying a plurality of non-unique identifiers that each appear within the first profile and the second profile. Examples of unique identifiers may include full names, email addresses, phone numbers, home addresses, and/or instant messaging usernames. Examples of non-unique identifiers may include partial names, locations, job titles, profile images, and/or keyword strings. In some examples, a user may have several profiles that include overlapping information.

Figure 4:
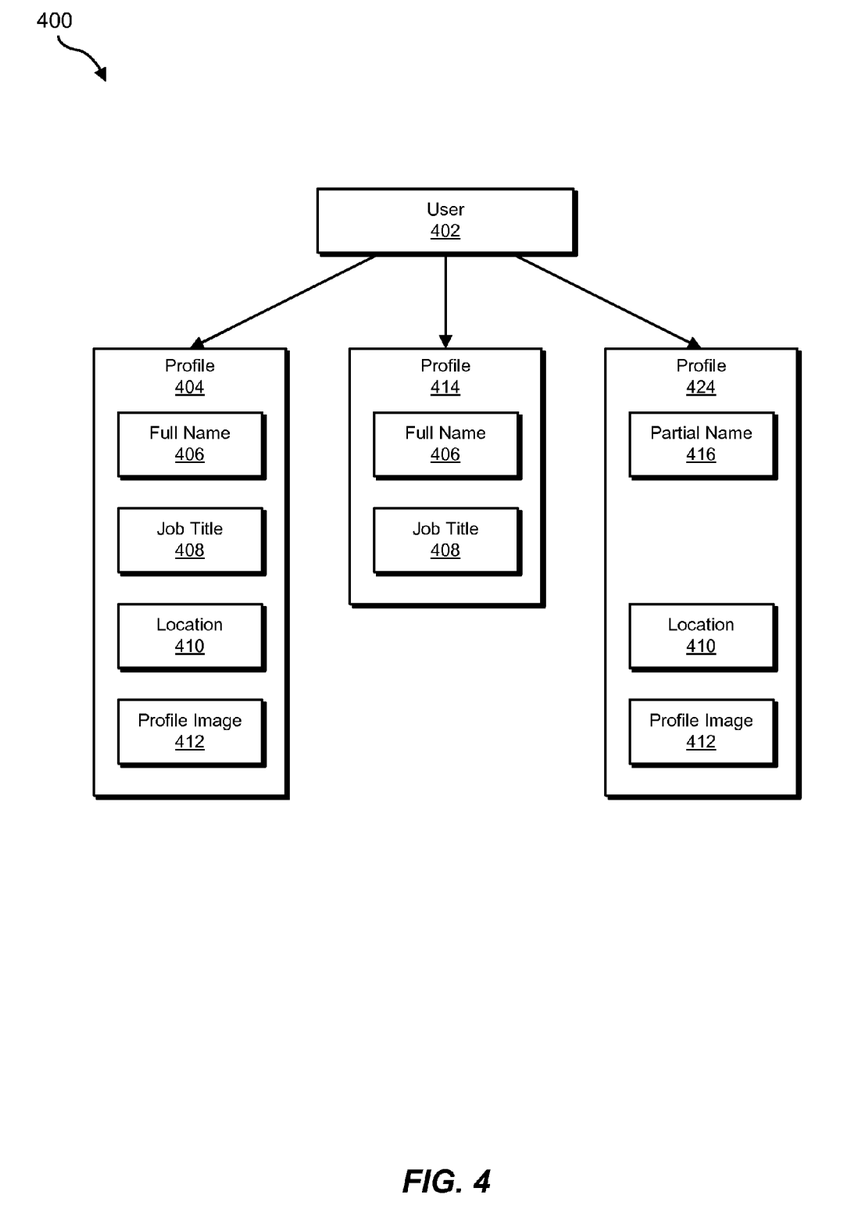
FIG. 4 is a block diagram of an exemplary set of data for protecting organizations against spear phishing attacks.

FIG. 4 is a block diagram of a plurality of user profiles within an exemplary computing system 400 for protecting organizations against spear phishing attacks. As illustrated in FIG. 4, user 402 may have profiles 404, 414 and/or 424. Profile 404 may include full name 406, job title 408, location 410, and/or profile image 412. Profile 414 may include full name 406 and/or job title 408. Profile 424 may include partial name 416, location 410 and/or profile image 412. In one example, profile 404 may be a profile on the organization's web site which may include an image of the organization's Denver office Information Technology manager, John D. Smith. Profile 414 may be a profile on a social media site such as LINKEDIN, which may include John D. Smith's full name and/or his job title, Information Technology manager. Profile 424 may be a profile on a social networking site, such as FACEBOOK, which may include a partial name, Johnny Smith, the location Denver, and/or a profile image. In this example, determination module 108 may determine that profile 404 and profile 414 both belong to the user John D. Smith by identifying the user's full name in both profiles. Determination module 108 may also determine that profile 424 belongs to the user by identifying the location Denver and the same profile image on both profile 404 and profile 424 and/or determining that the partial name Johnny Smith falls within a tolerance range of the full name John D. Smith.

Returning to FIG. 3, at step 308 one or more of the systems described herein may identify at least one phishing attack risk factor in the portion of the plurality of user profiles that belongs to the individual user. For example, at step 308 identification module 110 may, as part of computing device 202 in FIG. 2, identify at least one phishing attack risk factor 220 in user profiles 212 and/or 214 that belong to individual user 218.

The phrase "phishing attack," as used herein, generally refers to any attempt by a malicious entity to appear trustworthy (e.g., by impersonating another entity) for the purposes of gaining information. The phrase "spear phishing attack," as used herein, generally refers to any phishing attack that is targeted at a particular user (e.g., a phishing attack that targets a particular user because of a known characteristic of that user and/or that is designed to trick that user based on known characteristic of that user). In various instances, as used herein, the phrase "phishing attack" may refer specifically to a spear phishing attack. For example, an attacker may impersonate a representative of a legitimate organization and/or a trusted colleague in an attempt to gain sensitive information from a user. In some examples, gaining sensitive information from the user may be accomplished by convincing the user to download malicious software that may relay information from the user's computing device to the attacker. In one example, an attacker may send the user an email impersonating a fellow attendee of a technical conference in an attempt to get the user to download an email attachment containing a Trojan.

The phrase "phishing attack risk factor," as used herein, generally refers to any characteristic of a user or publicly available information about a user that may make an attacker more likely to target the user with a phishing attack. In some examples, the phishing attack risk factor may include a characteristic that has been determined to statistically correlate with being targeted for phishing attacks. For example, a user's job title may indicate that the user likely has access to sensitive resources, making the user an attractive target for attackers. In another example, a user may post a large amount of information about their job history, travel, conference attendance, external collaboration, personal hobbies and/or other activities on social media platforms, creating many opportunities for attackers to craft a convincing impersonation. Additionally or alternatively, a user's profile (e.g., keywords and/or phrases within the user's profile) may indicate that they are less technically savvy, a temporary employee, a disgruntled employee, and/or well-connected internally within the organization and/or externally to the organization.

Identification module 110 may identify the phishing attack risk factors in a variety of ways. For example, identification module 110 may scan the personal information for key words and phrases associated with phishing risks. In one example, identification module 110 may locate the phrases "technology conference," "engineer at Symantec," and/or "interview with TechCrunch" in a user's profile and identify the phrases as phishing attack risk factors.

At step 310 one or more of the systems described herein may assess, based at least in part on the phishing attack risk factor, a risk of a phishing attack targeting the individual user to illegitimately gain access to the privileged computing resource. For example, at step 310 assessment module 112 may, as part of computing device 202 in FIG. 2, assess, based at least in part on phishing attack risk factor 220, a risk of a phishing attack targeting individual user 218 to illegitimately gain access to the privileged computing resource.

Assessment module 112 may assess the risk of the phishing attack in a variety of ways. For example, assessment module 112 may categorize users to determine their individual risks of being targeted by phishing attacks. In one example, assessment module 112 may use a machine learning classifier to categorize users in order to calculate the risk of the phishing attack.

In some examples, assessment module 112 may assesses the risk of the phishing attack targeting the individual users in several steps. First, assessment module 112 may identify a set of training data that includes user profiles of users within organizations previously targeted by phishing attacks, (where the set of training data indicates which users were targeted by the phishing attacks). Next, assessment module 112 may use the set of training data to build a machine learning classifier that classifies users, based on user profile data, according to likelihood that each user will be targeted in phishing attacks. Finally, assessment module 112 may assess the risk of the phishing attack targeting the individual user with the machine learning classifier by providing the phishing attack risk factor as input to the machine learning classifier. In one example, assessment module 112 may use a database of victim data from previous phishing attacks as training data for the classifier. In this example, assessment module 112 may normalize the user profile data against the victim data and/or use a naïve Bayes classifier to classify the user profiles. In some examples, the victim data may be collected in the same manner that the user profile data was collected, as described above, and/or may include a list of users not known to have been targeted by phishing attacks.

In one example, assessment module 112 may categorize users based on job level and/or job type to determine their likely access to sensitive computing resources. Examples of job level may include director, intern, support, contractor, individual contributor, manager, and/or executive. Examples of job type may include research, quality assurance, operations, legal, engineering, sales, marketing, finance, human resources, information technology, and/or technical. In one example, a user categorized as an information technology manager may be at a much higher risk for a phishing attack than a user categorized as a human resources contractor due to the former user's higher level of access to sensitive computing resources.

In some examples, assessment module 112 may also categorize users based on location. For example, assessment module 112 may categorize users based on their country. In some embodiments, assessment module 112 may search the Internet to determine a user's country based on other location data in the user's profile, such as city, region, state, and/or province.

Additionally or alternatively, assessment module 112 may categorize users based on the way the users interact with the websites. For example, assessment module 112 may calculate activity and/or privacy scores for a user based on the amount of the user's activity on social media platforms and/or the amount of information the user reveals on social media platforms. Examples of activity may include group membership, forum posts, wall posts, likes, shares, status updates, connections with other users, and/or comments. In some embodiments, a weighted average of the user's job type, job level, location, places visited, activity score, and/or privacy store may be used to determine the user's phishing attack risk. In some examples, website specific features such as PEEKSCORE, FACEBOOK feeds, and/or TWEETS may be used to calculate the weighted average.

Figure 5:
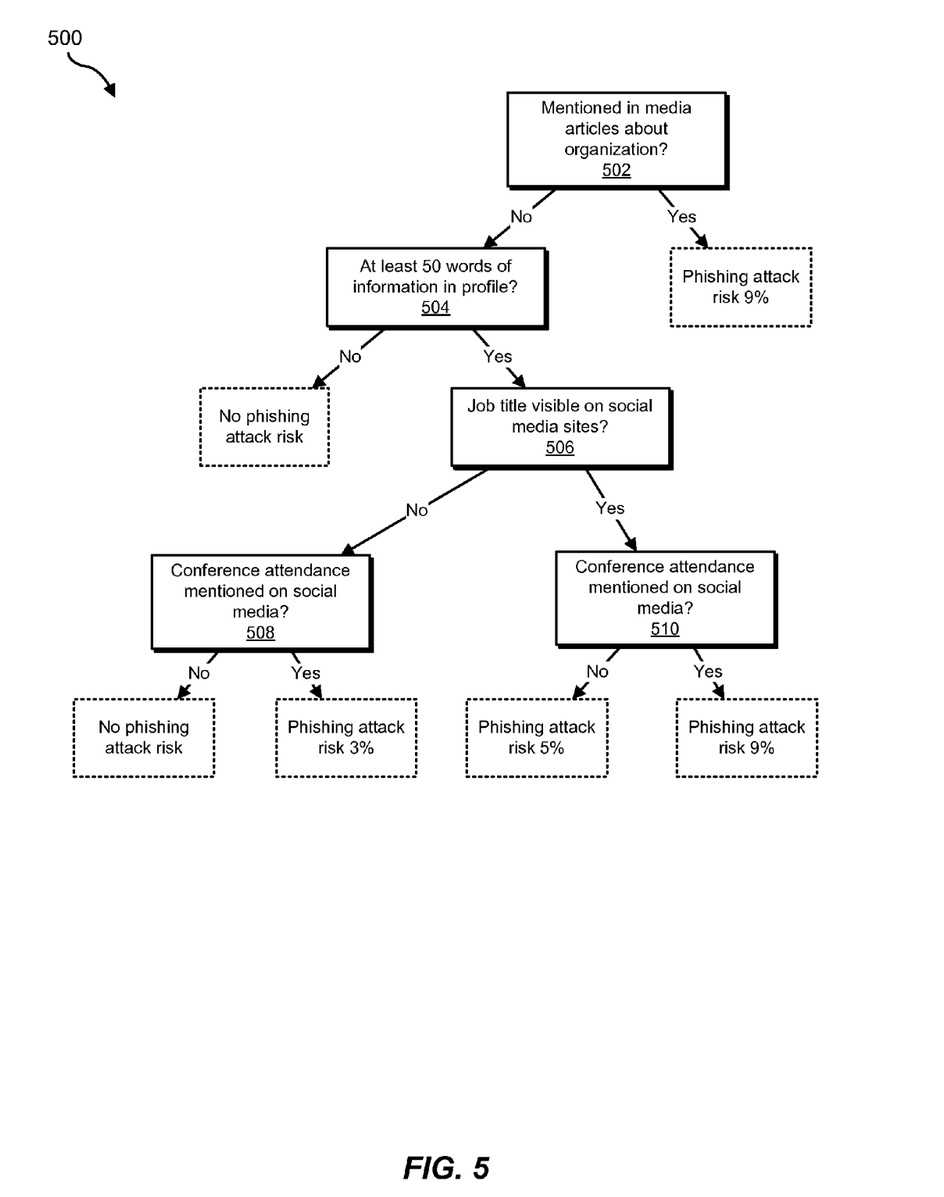
FIG. 5 is a block diagram of an exemplary decision tree for protecting organizations against spear phishing attacks.

In some embodiments, a machine learning classifier may use a decision tree to calculate the likelihood that a user will be targeted by a phishing attack. FIG. 5 is a block diagram of an exemplary computing system 500 for protecting organizations against spear phishing attacks by analyzing decision trees.

In one example, as illustrated in FIG. 5, the machine learning classifier being generated with the set of training data may indicate that being mentioned in media articles about the organization, having an at least minimally filled out profile, displaying a job title, and referencing conference attendance on social media may all be phishing attack risk factors. In this example, the machine learning classifier may analyze the user's profile for links to websites where the user is mentioned in media articles about the organization as shown at step 502. If this is the case, the user's risk of phishing attack may be 9%. If not, the classifier may then determine whether there are at least 50 words of information in the user's profile at step 504. If not, there is no risk of phishing attack; if there are at least 50 words, the classifier may progress to step 506 and determine whether the user's job title is visible on social media sites.

If the outcome of the decision at step 506 is "no," the classifier may move to step 508 and analyze the personal information retrieves from social media platforms to determine if the user mentioned attending any conferences. If there is no such mention of conference attendance, the user may have no phishing attack risk. If there is a mention of conference attendance, the phishing attack risk may be 3%. If the outcome of the decision at step 506 is "yes," the classifier may also check for conference attendance mentions at step 510, but the final risk calculation may be different than the results at step 508. If the user has mentioned conference attendance at step 510 the phishing attack risk may be 9%; if not, the phishing attack risk may be 5%.

In some embodiments, assessment module 112 may use an odds ratio to normalize profiles before performing the analysis. For example, the assessment module 112 may discard any feature with an odds ratio of less than one. In some examples, assessment module 112 may discard features with similar histograms between previous phishing attack victims and non-victims in the training data. Additionally or alternatively, assessment module 112 may discard features with similar means for both victims and non-victims in the training data.

In some embodiments, systems described herein may perform a security action based on the risk of the phishing attack targeting the individual user. The security action may be based on the level of risk, based on one or more characteristics of the expected phishing attack, and/or may be the same for any phishing attack risk.

In some examples, systems described herein may define the security action by selecting the security action from a set of potential security actions for addressing phishing attacks based on the phishing attack risk factor and/or by configuring the security action with a parameter based on the phishing attack risk factor. In some examples, the security action may include (1) adding an email filter for the individual user with at least one keyword derived from the phishing attack risk factor, (2) adjusting a privilege of the individual user to access the privileged computing resource, and/or (3) warning the individual user about the phishing attack risk factor. For example, a user whose high phishing attack risk is based on the high volume of information disclosed in their social media profiles may be advised to remove some of the information, while a user whose high phishing attack risk is based on their job title may be provided with additional security systems for their computing devices. In another example, a user whose high phishing attack risk is based on their conference attendance may be provided with email filters configured to flag keywords such as "conference," "PowerPoint," and/or "workshop." Additionally or alternatively, the security action may include increasing the aggressiveness of anti-phishing engines for the user, generating recommendations for user profile information to hide and/or remove, altering public profiles of the user, educating the user about potential phishing attack risks, and/or enhancing organizational information security policies for social media. In some embodiments, the security action may include performing forensic analysis after a phishing attack has occurred in order to improve future phishing prevention efforts.

As explained above in connection with method 300 in FIG. 3, systems described herein may search websites for user profiles of users linked to the organization. In many cases the websites may be social media platforms and/or the user profiles may be identified by keywords suggesting employment with the organization. Systems described herein may then retrieve personal information such as names, job titles, email addresses, profile images, and/or hyperlinks from the user profiles.

Next, systems described herein may identify and merge profiles belonging to the same user. The simplest ways of identifying matching profiles are by following hyperlinks between the profiles and/or by using unique identifiers such as full names and/or email addresses. Absent this information, multiple partial identifiers such as partial names, profile images, job titles, and/or locations may be used. Once the profiles are merged, they may be analyzed for phishing attack risk factors.

Analyzing the merged profiles for phishing attack risk factors may include scanning the profiles for key words and phrases that indicate the user's job title and/or activities. Assessing the risk of the spear phishing attack may include categorizing the user by their level of perceived access to sensitive resources due to their job level and/or job type. Systems described herein may then perform a security action based on the user's level of risk and/or the factors that contributed the risk.

By gathering and analyzing data in a similar manner to the methods used by potential attackers, organizations may identify both users in need of additional protection from spear phishing attacks and the forms which these attacks may take. This information may allow organizations to put security measures in place to better educate and protect their users, thus reducing the risk of successful spear phishing attacks and preventing the damage such attacks may do to the organization.

Figure 6:
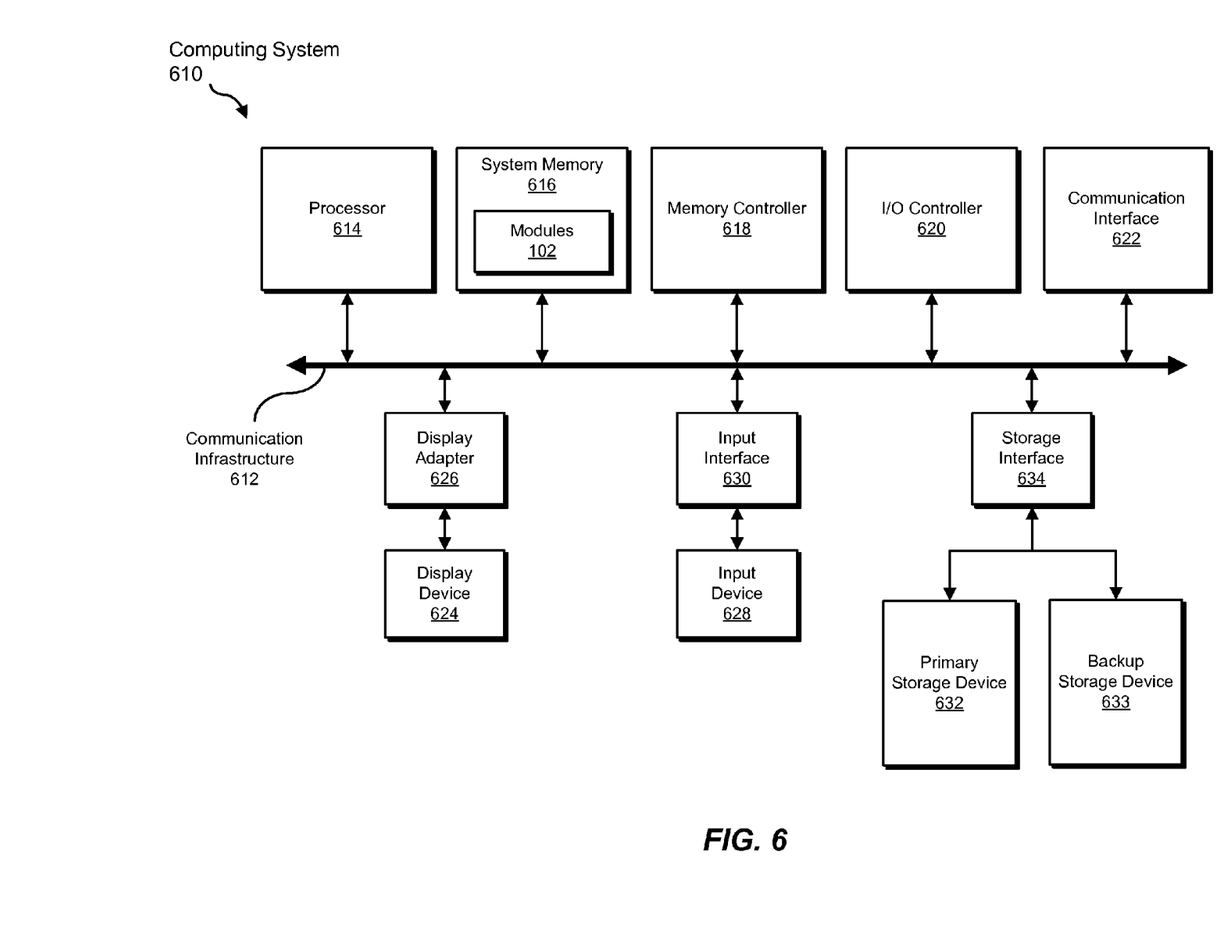
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
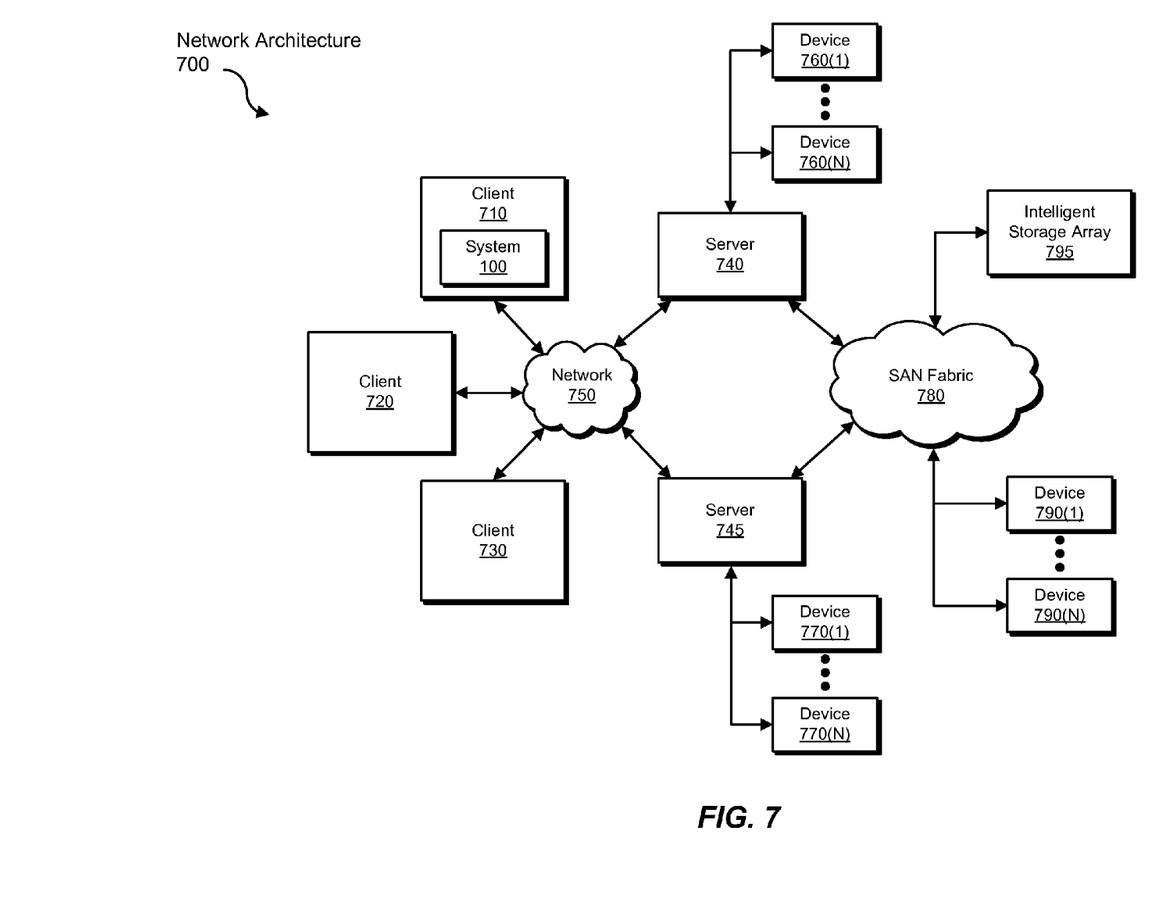
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for protecting organizations against spear phishing attacks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive user profile data to be transformed, transform the user profile data, output a result of the transformation to a machine learning program, use the result of the transformation to assess phishing risk factors, and store the result of the transformation to a database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting organizations against spear phishing attacks, at least a portion of the method being performed by a computing device comprising at least one processor, the method comprising:
   searching a plurality of websites for a plurality of user profiles belonging to a plurality of users who are affiliated with an organization and who have access to at least one privileged computing resource controlled by the organization;
   retrieving, from the plurality of user profiles, personal information describing the plurality of users;
   determining, based on the personal information, that a portion of the plurality of user profiles belongs to an individual user with access to the privileged computing resource controlled by the organization;
   identifying at least one phishing attack risk factor in the portion of the plurality of user profiles that belongs to the individual user;
   assessing, based at least in part on the phishing attack risk factor, a risk of a phishing attack targeting the individual user to illegitimately gain access to the privileged computing resource.

2. The computer-implemented method of claim 1, further comprising performing a security action based on the risk of the phishing attack targeting the individual user.

3. The computer-implemented method of claim 2, further comprising defining the security action by at least one of:
   selecting the security action from a set of potential security actions for addressing phishing attacks based on the phishing attack risk factor;
   configuring the security action with a parameter based on the phishing attack risk factor.

4. The computer-implemented method of claim 2, wherein the security action comprises at least one of:
   adding an email filter for the individual user with at least one keyword derived from the phishing attack risk factor;
   adjusting a privilege of the individual user to access the privileged computing resource;
   warning the individual user about the phishing attack risk factor.

5. The computer-implemented method of claim 1, wherein the plurality of websites comprises at least one third-party website not controlled by the organization.

6. The computer-implemented method of claim 1, wherein the plurality of users who are affiliated with the organization comprise at least one of:
   employees of the organization;
   former employees of the organization;
   contractors hired by the organization.

7. The computer-implemented method of claim 1, wherein determining, based on the personal information, that the portion of the plurality of user profiles belongs to the individual user comprises:
   determining that a first profile within the portion of the plurality of the user profiles belongs to the individual user;
   determining that a second profile within the portion of the plurality of user profiles also belongs to the individual user by at least one of:
      identifying a hyperlink from the first profile to the second profile;
      identifying a unique identifier for the individual user that appears within both the first profile and the second profile;
      identifying a plurality of non-unique identifiers that each appear within the first profile and the second profile.

8. The computer-implemented method of claim 1, wherein assessing the risk of the phishing attack targeting the individual users comprises:
   identifying a set of training data that comprises user profiles of users within organizations previously targeted by phishing attacks, wherein the set of training data indicates which users were targeted by the phishing attacks;
   using the set of training data to build a machine learning classifier that classifies users, based on user profile data, according to a likelihood that each user will be targeted in phishing attacks;
   assessing the risk of the phishing attack targeting the individual user with the machine learning classifier by providing the phishing attack risk factor as input to the machine learning classifier.

9. A system for protecting organizations against spear phishing attacks, the system comprising:
   a search module, stored in memory, that searches a plurality of websites for a plurality of user profiles belonging to a plurality of users who are affiliated with an organization and who have access to at least one privileged computing resource controlled by the organization;
   a retrieval module, stored in memory, that retrieves, from the plurality of user profiles, personal information describing the plurality of users;
   a determination module, stored in memory, that determines, based on the personal information, that a portion of the plurality of user profiles belongs to an individual user with access to the privileged computing resource controlled by the organization;
   an identification module, stored in memory, that identifies at least one phishing attack risk factor in the portion of the plurality of user profiles that belongs to the individual user;
   an assessment module, stored in memory, that assesses, based at least in part on the phishing attack risk factor, a risk of a phishing attack targeting the individual user to illegitimately gain access to the privileged computing resource;
   at least one physical processor configured to execute the search module, the retrieval module, the determination module, the identification module, and the assessment module.

10. The system of claim 9, further comprising a security module, stored in memory, that performs a security action based on the risk of the phishing attack targeting the individual user.

11. The system of claim 10, wherein the security module defines the security action by at least one of:

selecting the security action from a set of potential security actions for addressing phishing attacks based on the phishing attack risk factor;

configuring the security action with a parameter based on the phishing attack risk factor.

12. The system of claim 10, wherein the security module performs the security action by at least one of:

adding an email filter for the individual user with at least one keyword derived from the phishing attack risk factor;

adjusting a privilege of the individual user to access the privileged computing resource;

warning the individual user about the phishing attack risk factor.

13. The system of claim 9, wherein the plurality of websites comprises at least one third-party website not controlled by the organization.

14. The system of claim 9, wherein the plurality of users who are affiliated with the organization comprise at least one of:

employees of the organization;

former employees of the organization;

contractors hired by the organization.

15. The system of claim 9, wherein the determination module determines, based on the personal information, that the portion of the plurality of user profiles belongs to the individual user by:

determining that a first profile within the portion of the plurality of the user profiles belongs to the individual user;

determining that a second profile within the portion of the plurality of user profiles also belongs to the individual user by at least one of:

identifying a hyperlink from the first profile to the second profile;

identifying a unique identifier for the individual user that appears within both the first profile and the second profile;

identifying a plurality of non-unique identifiers that each appear within the first profile and the second profile.

16. The system of claim 9, wherein the assessment module assesses the risk of the phishing attack targeting the individual users by:

identifying a set of training data that by user profiles of users within organizations previously targeted by phishing attacks, wherein the set of training data indicates which users were targeted by the phishing attacks;

using the set of training data to build a machine learning classifier that classifies users, based on user profile data, according to a likelihood that each user will be targeted in phishing attacks;

assessing the risk of the phishing attack targeting the individual user with the machine learning classifier by providing the phishing attack risk factor as input to the machine learning classifier.

17. A non-transitory computer-readable medium comprising one or more computer-readable instructions that, when executed by at least one processor of a computing device, cause the computing device to:

search a plurality of websites for a plurality of user profiles belonging to a plurality of users who are affiliated with an organization and who have access to at least one privileged computing resource controlled by the organization;

retrieve, from the plurality of user profiles, personal information describing the plurality of users;

determine, based on the personal information, that a portion of the plurality of user profiles belongs to an individual user with access to the privileged computing resource controlled by the organization;

identify at least one phishing attack risk factor in the portion of the plurality of user profiles that belongs to the individual user;

assess, based at least in part on the phishing attack risk factor, a risk of a phishing attack targeting the individual user to illegitimately gain access to the privileged computing resource.

18. The non-transitory computer-readable medium of claim 17, wherein the one or more computer-readable instructions cause the computing device to perform a security action based on the risk of the phishing attack targeting the individual user.

19. The non-transitory computer-readable medium of claim 18, wherein the one or more computer-readable instructions cause the computing device to define the security action by at least one of:

selecting the security action from a set of potential security actions for addressing phishing attacks based on the phishing attack risk factor;

configuring the security action with a parameter based on the phishing attack risk factor.

20. The non-transitory computer-readable medium of claim 18, wherein the one or more computer-readable instructions cause the computing device perform the security action by at least one of:

adding an email filter for the individual user with at least one keyword derived from the phishing attack risk factor;

adjusting a privilege of the individual user to access the privileged computing resource;

warning the individual user about the phishing attack risk factor.

* * * * *

UNITED STATES PATENT AND TRADEMARK OFFICE
CERTIFICATE OF CORRECTION

| | | |
|---|---|---|
| PATENT NO. | : 9,160,766 B2 | Page 1 of 1 |
| APPLICATION NO. | : 14/262422 | |
| DATED | : October 13, 2015 | |
| INVENTOR(S) | : Anand Kashyap and Sudhanshu Shekhar | |

It is certified that error appears in the above-identified patent and that said Letters Patent is hereby corrected as shown below:

Claim 16, at column 21, line 44, should read:
identifying a set of training data that comprises user profiles of Claim 20, at column 22, lines 41 to 44, should read:
The non-transitory computer-readable medium of claim 18, wherein the one or more computer-readable instructions cause the computing device to perform the security action by at least one of:

Signed and Sealed this
Fifth Day of July, 2016

Michelle K. Lee
*Director of the United States Patent and Trademark Office*